T. B. WATSON & J. J. BRASINGTON.
SEED HARVESTER.
APPLICATION FILED JULY 15, 1916.
1,221,119.
Patented Apr. 3, 1917.
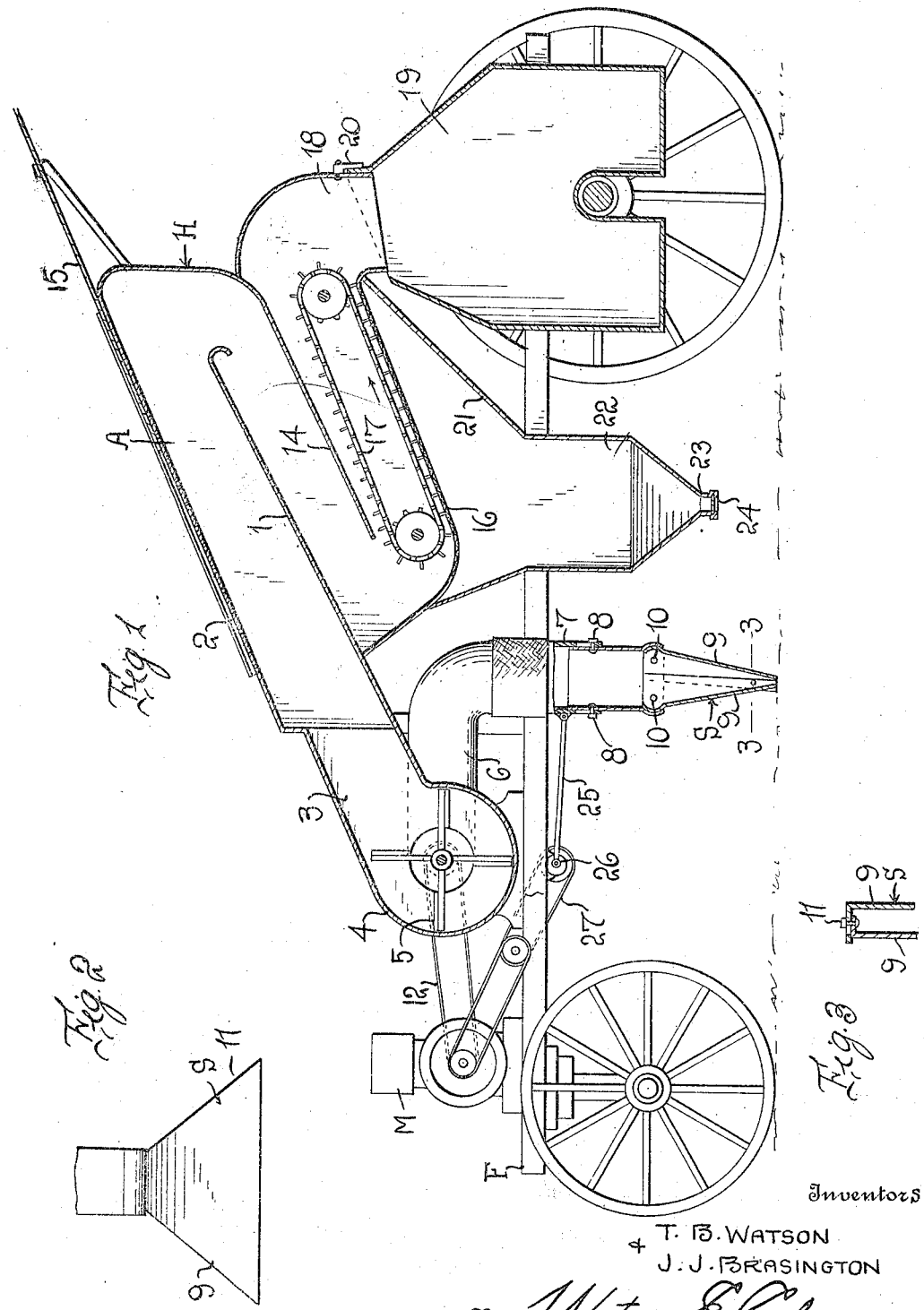
Inventors
T. B. WATSON
J. J. BRASINGTON
By Watson E. Coleman
Attorney

UNITED STATES PATENT OFFICE.

TYLER B. WATSON AND JOHN J. BRASINGTON, OF CHERAW, SOUTH CAROLINA.

SEED-HARVESTER.

1,221,119.    Specification of Letters Patent.    Patented Apr. 3, 1917.

Application filed July 15, 1916. Serial No. 109,528.

*To all whom it may concern:*

Be it known that we, TYLER B. WATSON and JOHN J. BRASINGTON, citizens of the United States, residing at Cheraw, in the county of Chesterfield and State of South Carolina, have invented certain new and useful Improvements in Seed-Harvesters, of which the following is a specification, reference being had to the accompanying drawings.

This invention relates to certain improvements in seed harvesters and has relation more particularly to a device of this general character especially designed and adapted for use in connection with bur clovers lying upon the ground; and it is an object of the invention to provide novel and improved means whereby the seed may be readily and conveniently collected and whereby dirt or other foreign substances may be separated therefrom after being collected.

Furthermore it is an object of the invention to provide a novel and improved device wherein suction means is employed for collecting the seed and wherein a collecting spout or head is employed which is capable of adjustment relative to the surface with which the same coacts and whereby the area of the entrance opening of said head or spout may be varied in accordance with the requirements of practice.

The invention has for a still further object to provide a novel and improved device of this general character wherein the collecting head or spout may be vibrated in order to facilitate the collecting operation.

The invention consists in the details of construction and in the combination and arrangement of the several parts of our improved seed harvester whereby certain important advantages are attained and the device is rendered simpler, less expensive and otherwise more convenient and advantageous for use, all as will be hereinafter more fully set forth.

The novel features of the invention will hereinafter be definitely claimed.

In order that our invention may be the better understood, we will now proceed to describe the same with reference to the accompanying drawings, wherein Figure 1 is a view partly in side elevation and partly in vertical section of a seed harvester, constructed in accordance with an embodiment of our invention;

Fig. 2 is a fragmentary view in front elevation of the lower portion of the collecting or suction head as herein included; and Fig. 3 is a fragmentary sectional view taken substantially on the line 3—3 of Fig. 1.

As disclosed in the accompanying drawings, F denotes a portable frame of any ordinary or preferred construction and has mounted thereon the housing H, the upper portion of which being provided with a compartment A, the lower wall or bottom 1 of which being disposed upwardly and rearwardly on a predetermined incline. The top 2 of the compartment A is perforate for a purpose which will hereinafter be more particularly referred to.

In communication with the lower portion of the compartment A is a spout 3 leading from the casing 4 of the suction fan 5. In requisite communication with the casing 4 is the conduit 6 terminating in the depending portion 7 terminating below the frame F and with which is operatively engaged the suction head S.

The head S is capable of vertical adjustment as is believed to be shown in the accompanying drawings and is maintained in its various vertically adjusted positions in any conventional manner as indicated at 8. When the surface over which the device travels is substantially flat the head S is adapted to be adjusted so as to bring the entrance end thereof in close proximity to the surface, but when the surface is uneven the head S is adapted to be adjusted upwardly a predetermined extent in accordance with the necessities of practice. The head S also comprises two complemental sections 9 having their upper end portions pivotally connected, as at 10, to the lower portion of the head proper, so that the lower or entrance end of said head S may be enlarged or restricted as the requirements of practice may dictate, and the sections may be held in their relative swinging adjustments in any desired manner as indicated at 11.

The suction fan 5 as herein embodied is operatively engaged, as at 12, with a suitable source of power herein disclosed as a conventional motor M, and it will be perceived that said fan 5 serves to draw or suck from the ground the bur clovers or other seed lying thereon and also throws such collected bur clover or seed upwardly along the inclined bottom 1 and with sufficient force to cause said bur clover or other seed to pass over the upper or discharging end of the bottom 1 and upon the downwardly inclined apron 14 arranged within the housing H.

The dirt or the like which is collected with the seed passes through the perforate top 2 and is thereby separated therefrom. Coacting with the perforate top 2 is the slide 15 whereby it will be perceived that the blast of air entering within the compartment A may be controlled.

In practice it is only desired that the force of the blast be sufficient to carry the collected seeds to the upper or discharge end of the bottom 1 and not pass downwardly of the apron 14 as it is preferred that the collected matter travel downwardly of the apron 14 by gravity.

The apron 14 discharges upon the screening element 16 with which coacts the straw carrier 17 of any ordinary or preferred construction and operated in any desired manner, and said straw carrier 17 causes the straw or other fibrous matter to be discharged through the depending chute 18 into the receptacle 19 pivotally supported by the frame F. When the receptacle 19 is filled it is only necessary to swing the same downwardly to dump out the contents thereof. The receptacle 19 may be maintained in operative position in any desired manner as indicated at 20.

The seed falling through the screening element 16 drops upon the downwardly and forwardly inclined apron 21 and is collected within the hopper 22. The hopper 22 is provided with the discharge spout 23 under control of the valve 24. By this it will be perceived that upon the hopper 22 becoming filled the seed can be readily taken therefrom.

Operatively engaged with the depending portion of the conduit 6 is a pitman 25 which is also operatively engaged with the rotatable disk 26 adapted to be driven in any desired manner as indicated at 27. By this means it will be perceived that the head S will be vibrated and which vibration results in a whirling action of the air at the entrance opening of the head S and which materially facilitates the collecting operation.

It is also to be noted that the rear end of the housing H is closed and that the screening element 16 is disposed on a predetermined upward and inward incline which, in practice, has been found to materially facilitate the operation of the harvester.

From the foregoing description, it is thought to be obvious that a seed harvester constructed in accordance with our invention is of an extremely simple and comparatively inexpensive nature and is particularly well adapted for use by reason of the convenience and facility with which it may be assembled, and it will also be obvious that our invention is susceptible of some change and modification without material departure from the principles and spirit thereof and for this reason we do not wish to be understood as limiting ourselves to the precise arrangement and formation of the several parts herein shown in carrying out our invention in practice, except as hereinafter claimed.

We claim:

1. A harvester of the character described comprising an inclosed housing having its top perforate, an inclined bottom disposed within the housing, a conduit leading from the lower portion of the bottom and terminating in a substantially vertically disposed portion, a suction fan interposed in said conduit, a collecting head engaged with the vertically disposed portion of the conduit, and a slide member coacting with the perforate top.

2. A harvester of the character described comprising an inclosed housing having its top perforate, an inclined bottom disposed within the housing, a conduit leading from the lower portion of the bottom and terminating in a substantially vertically disposed portion, a suction fan interposed in said conduit, a collecting head engaged with the vertically disposed portion of the conduit, said collecting head including complemental sections having their upper extremities pivotally connected whereby the area of the entrance opening of the head may be regulated.

3. A harvester of the character described comprising an inclosed housing having its top perforate, an inclined bottom disposed within the housing, a conduit leading from the lower portion of the bottom and terminating in a substantially vertically disposed portion, a suction fan interposed in said conduit, a collecting head engaged with the vertically disposed portion of the conduit, and means for vibrating the head.

4. A harvester of the character described comprising an inclosed housing having its top perforate, an inclined bottom disposed within the housing, a conduit leading from the lower portion of the bottom and terminating in a substantially vertically disposed portion, a suction fan interposed in said conduit, a collecting head engaged with the vertically disposed portion of the conduit, a screening element positioned below the inclined floor, a straw carrier coacting therewith, and an apron interposed between the inclined floor and the straw carrier and upon which said floor discharges.

5. A harvester of the character described comprising an inclosed housing having its top perforate, an inclined bottom disposed within the housing, a conduit leading from the lower portion of the bottom and terminating in a substantially vertically disposed portion, a suction fan interposed in said conduit, a collecting head engaged with the vertically disposed portion of the conduit, a screening element positioned below the inclined floor, a straw carrier coacting therewith, an apron interposed between the inclined floor and the straw carrier and upon which said floor discharges, and a receptacle into which the screening element discharges.

6. A harvester of the character described comprising an inclosed housing having its top perforate, an inclined bottom disposed within the housing, a conduit leading from the lower portion of the bottom and terminating in a substantially vertically disposed portion, a suction fan interposed in said conduit, a collecting head engaged with the vertically disposed portion of the conduit, a screening element positioned below the inclined floor, a straw carrier coacting therewith, an apron interposed between the inclined floor and the straw carrier and upon which said floor discharges, a collecting hopper, and an apron disposed beneath the screening element and discharging in the hopper.

In testimony whereof we hereunto affix our signatures in the presence of two witnesses.

TYLER B. WATSON.
JOHN J. BRASINGTON.

Witnesses:
  J. M. BRASINGTON,
  S. G. GODFREY.